US007537161B2

(12) United States Patent
Mayer et al.

(10) Patent No.: US 7,537,161 B2
(45) Date of Patent: May 26, 2009

(54) METHOD AND DEVICE FOR CHECKING AUTHENTICITY OF A SECURITY ELEMENT

(75) Inventors: Karlheinz Mayer, Augsburg (DE); Reinhard Plaschka, Windach (DE); Georg Depta, Rosenheim (DE)

(73) Assignee: Giesecke & Devrient GmbH, Munich (DE)

( * ) Notice: Subject to any disclaimer, the term of this patent is extended or adjusted under 35 U.S.C. 154(b) by 245 days.

(21) Appl. No.: 10/522,231

(22) PCT Filed: Jul. 24, 2003

(86) PCT No.: PCT/EP03/08135

§ 371 (c)(1),
(2), (4) Date: Sep. 7, 2005

(87) PCT Pub. No.: WO2004/011273

PCT Pub. Date: Feb. 5, 2004

(65) Prior Publication Data

US 2006/0124741 A1 Jun. 15, 2006

(30) Foreign Application Priority Data

Jul. 25, 2002 (DE) ................................ 102 33 928

(51) Int. Cl.
*G06K 7/14* (2006.01)

(52) U.S. Cl. .................... 235/454; 235/491; 235/462.21

(58) Field of Classification Search ................. 235/454, 235/491, 462.41, 462.42, 457; 356/71, 73.1
See application file for complete search history.

(56) References Cited

U.S. PATENT DOCUMENTS

| | | | | |
|---|---|---|---|---|
| 5,635,726 | A * | 6/1997 | Zavislan et al. | 250/559.44 |
| 5,815,598 | A * | 9/1998 | Hara et al. | 382/211 |
| 6,061,122 | A * | 5/2000 | Hoshino et al. | 356/71 |
| 6,301,047 | B1 * | 10/2001 | Hoshino et al. | 359/566 |
| 6,304,380 | B1 * | 10/2001 | Doerr | 359/484 |
| 6,570,648 | B1 * | 5/2003 | Muller-Rees et al. | 356/71 |
| 6,628,439 | B2 * | 9/2003 | Shiozawa et al. | 359/2 |
| 6,729,541 | B1 * | 5/2004 | Kurokawa et al. | 235/454 |

FOREIGN PATENT DOCUMENTS

EP 0 899 119 A 3/1999

* cited by examiner

*Primary Examiner*—Ahshik Kim
(74) *Attorney, Agent, or Firm*—Rothwell, Figg, Ernst & Manbeck, P.C.

(57) ABSTRACT

The invention relates to a method, in which from two images of a security element, which are recorded with right-handed and left-handed circularly polarizing filters, a differential image is produced, on the basis of which the authenticity of the security element is tested, and an apparatus for carrying out the method.

32 Claims, 2 Drawing Sheets

METHOD AND DEVICE FOR CHECKING AUTHENTICITY OF A SECURITY ELEMENT

CROSS-REFERENCE TO RELATED APPLICATION

This application is a National Phase of International Application Serial No. PCT/EP03/08135, filed Jul. 24, 2003.

FIELD OF THE INVENTION

The invention relates to a method for authenticity testing a security element on the basis of liquid-crystalline materials, and an apparatus for carrying out the method.

DESCRIPTION OF THE BACKGROUND ART

As to protect objects, such as for example documents and papers of value, but also spare parts, drugs, textiles or other trademarked products of the consumer goods sector from imitation and forgery as well as tampering, and for being able to test the authenticity of these objects, they are equipped with special security elements. Known security elements are, for example, watermarks or security threads incorporated into paper, luminescent or magnetic particles, which for example are added to printing inks, or embossed holograms, which are applied as a foil element to the surface of the objects or their packaging to be protected. For producing known security elements substances and pigments are used, which due to their particular optical properties cannot be imitated or only with great effort and which are not easily availably for everyone. This, for example, is the case for thin-film pigments, which when viewed or illuminated from different angles show different colours. Markings, such as prints, containing such pigments, for that reason are also referred to as "optically variable".

The group of optically variable materials also includes liquid-crystalline materials, the optical properties of which, such as absorption and reflection, in an aligned state are dependent on direction. Due to their superior processing properties, for security elements in particular cross-linked liquid-crystalline polymers are possible, which, for example, can be present as a thin foil-like layer or in the form of pigments. As small plates or as a pigment these liquid-crystalline polymers can be added to printing inks and lacquers or plastics and other polymeric binders, and processed with conventional techniques, such as for example printing, lacquering or methods of foil technology. The production and processing of pigments consisting of liquid-crystalline material is described for example in EP 0 601 483 A1.

When viewing liquid-crystalline material with chiral phase, not only the perceived colour dependent on the viewing angle changes, but also the light reflected from this material is circularly polarized. Depending on the molecular structure of the material, the polarization can be left-handed circular or right-handed circular. Security elements, which contain respective liquid-crystalline materials, due to their optically variable properties, have the advantage that, for example, their direction-dependent optical properties cannot be reproduced or imitated even by high-quality copy machines, scanners or photographic devices.

For example from EP 0 435 029 A1 it is known that data carriers, such as papers of value and documents, are equipped with security elements, which contain a liquid-crystalline material. For their authenticity testing colour filters, quarter-wave plates, beam splitters and linear polarizers and a pair of detectors are used. By comparing the signal strengths present at the two detectors, conclusions about the authenticity of the security feature can be drawn.

WO 94/02329, too, describes the use of liquid-crystalline materials for the protection of documents and papers of value. These materials are applied to translucent areas, in particular above watermarks. An authenticity testing is made, for example, with the help of detectors, which detect the portions of light that are transmitted and reflected by the security element. For the automatic evaluation by machine in particular stripe patterns are proposed, the liquid-crystalline material in neighboring stripes differing in its handedness.

SUMMARY OF THE INVENTION

But there exists a continuous demand for new and improved testing methods, in particular such, which are particularly reliable and capable of automation and which can be carried out fast and easy as well as by untrained personnel. A further aspect is to provide a method, which in particular is suitable for testing deposit tokens on containers with a refundable deposit. It was the problem of the invention to provide such a method and a respective apparatus for carrying out the method. This problem is solved by a method or an apparatus having the features disclosed herein.

The security elements possible for this purpose are based on liquid-crystalline materials and have at least one first marking with right-handed circularly polarizing material and at least one second marking with left-handed circularly polarizing material. Alternatively, only one marking is possible, too, which contains both right-handed circularly and left-handed circularly polarizing material. According to the invention, for testing the authenticity of such security elements, two images are recorded from the security elements, in which either the light impinging on the security elements or the light reflected by them is led through a circular polarizer, which basically lets through only the light of a predetermined polarization direction. If for the one image a filter is used that only lets through left-handed circularly polarized light, the other image is recorded with light that was filtered by a polarizer for right-handed circularly polarized light. On the basis of the two images of the security element a differential image is determined and from the differential image is derived a statement or decision about the authenticity of the security element. When determining the differences, the contrast between the marking with the right-handed circularly polarizing material and the marking with the left-handed circularly polarizing material, and the contrast to the surroundings of the marking/s, which have no polarizing material, are increased and thereby the locating of the marking/s within an image is simplified. By intensifying the contrast the visual perception of the marking or markings is better, and the markings can be easier edited by machine, i.e. by image processing. In addition there exists the possibility to pick up the different intensity or brightness degrees that in the differential image result from the differently polarizing materials, and to take them into account as a further information when authenticity testing the security element.

This method enables the recognition and thus a protection against different forgery attempts. If for the markings, for example, a printing ink is used, which is similar to the markings only with respect to colour, without, however, changing the polarization, the markings will not be shown in the differential image.

According to a further variant the security element has only one marking, which contains only one circularly polarizing material, preferably left-handed circularly polarizing material. The testing is also effected according to the already explained method. Two images are recorded, one with a right-handed circular polarization filter and one with a left-handed circular polarization filter. From the differential image determined thereof a statement or decision about the authenticity of the security element can be derived. For markings, which have only one polarization direction, a lower contrast in the differential image may be the result.

Since the polarization state of the light reflected by the security element with the liquid-crystalline material with chiral phase cannot be perceived with the naked eye, the security element visually can appear homogeneously, without the first and second marking to be perceived as different. The first and second marking with the right-handed or left-handed circularly polarizing material can be located directly adjacent to each other, or even overlap or enclose each other or also can be spaced-apart from each other. Not until with the help of a circular polarizer with a predetermined polarization direction an image recording or an imaging is made from the security element, the areas of the first and the second marking clearly differ from each other in their intensity. If, however, only one marking is employed, which contains both right-handed circularly and left-handed circularly polarizing material, for example in the form of a mixture of appropriate liquid-crystalline pigments, one receives at least a different intensity or brightness value of the marking on recording the images with two different circular polarizers, in case the contents or the effects of the differently polarizing materials in the marking differ from each other. This variant of the marking with respect to production engineering has the advantage that it is easier to produce, for example by one single printing operation, than the markings, which contain differently polarizing material in separate areas.

For the image recording of the security element it is possible both to work with the ambient light and to provide an illumination for the area to be imaged. An illumination, for example, is of advantage, when the conditions of the surroundings are unfavourable or unforeseeable, which in particular can occur, when the testing apparatus is designed as a mobile, transportable apparatus. By means of an illumination apparatus the image recording area is illuminated in a suitable fashion, i.e. in particular with sufficient light intensity. In particular flexible fibre bundles of light guides are suitable, which permit an absolutely precise illumination. Preferably also a shield against the ambient light is used, which keeps away possibly unsteady ambient light from the security element and thus ensures constant and reproducible image recording conditions when using an additional illumination.

The circular polarizers can be disposed either on the illumination side and filter the light impinging on the security element, or alternatively on the reflection side, the light reflected by the security element passing through the circular polarizer.

For the imagings in particular imaging methods are used, with which the area to be imaged is scanned point-by-point or line-by-line and the respective intensity values are thereby determined. Preferably, these intensity values are stored for their further editing or processing, for which in particular electronic storage media are possible. The line-by-line scanning is advantageous for the testing with high clock rates and the testing of moving objects. As image recording apparatuses for the imagings in particular digital cameras or video cameras are suitable.

The recording of the first and the second image with a right-handed or left-handed circular polarizer can be effected simultaneously or successively. If the two images are recorded successively, one imaging apparatus is sufficient, with which the two images of the security element are recorded. The change of the circular polarizer from right-handed to left-handed or vice versa to be carried out between the two image recordings can be effected manually. Preferred, however, is an automated change by machine of the circular polarizer, because therewith confusions are avoided and the two images can be recorded faster. The moving and changing of the filter or filters can be effected both by a linear and by a circular motion, for example by a so-called "chopper wheel". If the two images are recorded successively, the security element must not be moved in the time between the two image recordings. If this should be the case, such a movement can be compensated by methods of image processing, so as to bring the two images of the security element in congruence before determining the differential image.

If the two images recordings are effected simultaneously, which altogether enables a faster testing, for each image recording a separate image recording apparatus, i.e. for example two cameras, have to be employed. As to ensure the same viewing conditions for both imagings, preferably a beam splitter is used, which apportions the light reflected by the security element equally among the two image recording apparatuses. In this configuration the two polarizers, one right-handed circular and the other left-handed circular, necessarily have to be disposed after the beam splitter.

When determining the differential image from the two images it has to be paid attention to the fact that those image areas are used by way of comparison which correspond to each other. This can be effected, for example, by carefully aligning and positioning the object to be tested and the image recording apparatus/es, or by editing the preferably electronically stored image data with commonly used algorithms of image processing. In this way, too, can be ensured, that for determining the difference the same image areas are used. It can also be expedient to correct or correlate the individual images, so as to for example compensate or at least reduce systematically occurring errors or deviations, such as a signal offset, scattering effects or dazzling effects. The differential image is determined by subtracting the intensity value of a partial area of the first image from the respective intensity value of the corresponding partial area of the second image. A statement about the authenticity of the security element can be derived from an electronic evaluation of the differential image. For this purpose preferably methods of digital image processing and/or pattern recognition are used. The statement about the authenticity of the security element can be connected to an acoustic and/or optical signal or to the forwarding of suitable data, for example, a testing report. Preferably, the transfer of the testing result is effected by encoded data and/or together with an electronic signature and/or by the so-called "message authentication", with which the communication between sender and receptor is effected according to a predetermined protocol. It can be ensured thereby, that the testing results are not freely accessible and that they are protected from unauthorized manipulation. The testing result can be transmitted to a communication module, which forms a part of the testing apparatus, or it can be transferred to an external place. If the tested security elements are, for example, deposit tokens, the testing result can be transferred to an external cash system or a clearinghouse. Alternatively or additionally it is possible, that the differential image and if desired also the individual images are represented in a display device, such as for example a monitor or a display. Therefore, it is also possible, that the decision about the authenticity of a tested security element is made by, if necessary, trained inspectors.

One further possibility for facilitating the evaluation of the images consists of supplying the signals or brightness values obtained from the first and second image as well as the differential values determined therefrom each to a channel of an RGB monitor. The red, green or blue fractions of a common image are controlled by the intensity distributions of the individual images. The two markings and their surroundings then appear in clearly distinguishable colours in the RGB representation, and the markings can be easily located and verified with methods of image processing even on large areas. Instead of supplying the signals to the channels of an RGB monitor, the data can be stored digitally, the colour information being able to be stored also in other formats than RGB. These data then can be further processed by machine.

Beside the right-handed and left-handed polarization filters, additional colour filters can be used for authenticity testing a security element. By this means, preferably, the tested spectral region is limited and thus, for example, forgeries can be excluded, the markings of which may have the right polarization properties, but not the right reflection wavelength, and therefore appear in another colour. In addition, by colour filters, the transmission range of which is adjusted to the colour of the liquid-crystalline material used, the negative influence of external light or scattered light on an authenticity testing is reduced. Furthermore, with the help of colour filters can be tested the colour change, which occurs in liquid-crystalline materials with chiral phase on varying illumination and/or viewing angles. For this purpose the markings are illuminated, for example, from different angles and/or the light reflected by them is measured from different angles.

In a special variant of the inventive method one single circular polarizer is used, which has individual right-handed and left-handed areas, which are disposed in a checkerboard fashion alternatingly side-by-side. If such a filter is mounted directly in front of the detector of a camera, the individual image points (pixel) or image areas of the image recorded by the detector can each be allocated to a polarization direction. The two individual images then can be calculatory determined. If the individual filter areas are small enough, and in case of a still sufficient resolution, the gaps occurring in each individual image can be interpolated.

BRIEF DESCRIPTION OF THE DRAWINGS

In the following the invention is explained with reference to embodiments depicted in figures.

DETAILED DESCRIPTION OF THE INVENTION

Figure 1:
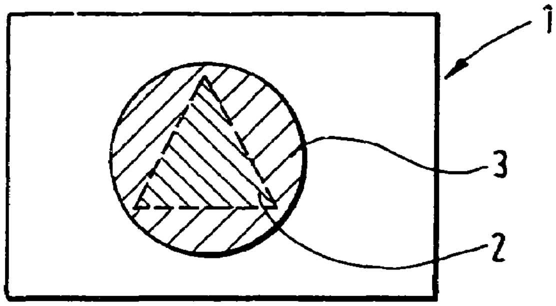
FIG. 1 shows a security element in a top view.

FIG. 1 shows a security element 1, which is formed as a label or a tag and which carries the two markings 2, 3 with the liquid-crystalline material as a print. But it is also possible to apply this print with the liquid-crystalline material directly onto the surface of an object to be secured or its packaging. The first marking 2 has the form of a triangle, which is enclosed on all sides by the second marking 3, which has a circular-shaped outer contour. The two markings can also have any other desired and technically feasible geometry. If one of the two markings polarizes reflected light in a left-handed circular fashion, the light reflected by the other marking is polarized in a right-handed circular fashion. The difference in the polarization of the reflected light is not perceptible by the human eye. I.e., the two markings for the naked human eye form a homogeneous surface, which shows the colour change dependent on the viewing angle that is known for liquid-crystalline pigments with chiral phase.

Figure 2:
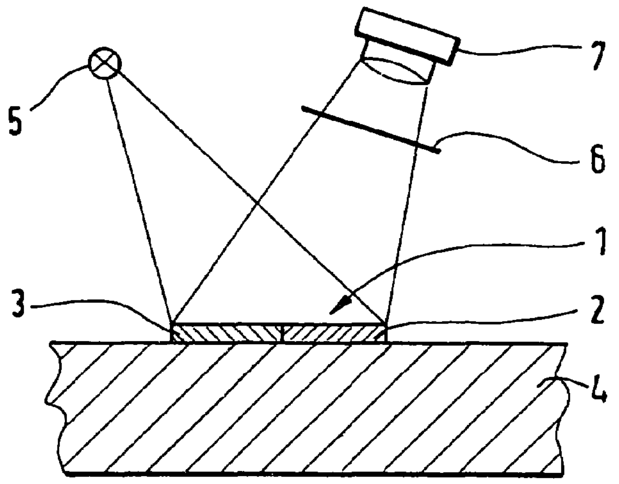
FIG. 2 shows a first arrangement for carrying out the inventive method.

In FIG. 2 a security element 1 is applied directly onto the surface of a substrate 4. This can be effected, for example, via adhesive layers not depicted in the FIG. 2, or via binding agents, which are contained in the layers forming the markings. The markings 2, 3 here constitute two areas located side by side and adjoining each other. The substrate 4 can consist of e.g. paper, cardboard, plastic or metal and constitutes, for example, a disposable container on which the security element 1 forms a deposit token to be tested. As an illumination apparatus 5, in particular, focusable light sources are employed, such as spot lamps with reflectors. With this light source the area of the two markings 2, 3 is illuminated and the light reflected by them is led through a circular polarizer 6. As an image recording apparatus for the images of the security element, for example, a camera 7 is used. Simple black-and-white video cameras are inexpensive and available in small overall sizes. For the two image recordings of the security element 1 the same camera 7 is used, but with different circular polarizers 6 for right-handed and left-handed polarization. The two images can be intermediately stored either in the camera 7 or in separate not-shown storage media, and for determining the differential image can be transferred to a system for electronic data processing.

Figure 3:
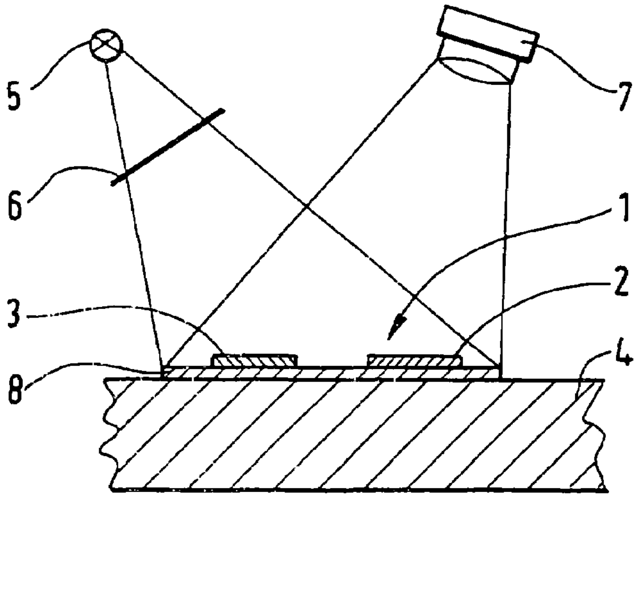
FIG. 3 shows a further arrangement for carrying out the inventive method.

An alternative arrangement for recording the images is shown in FIG. 3. The circular polarizer 6 here is disposed between the illumination apparatus 5 and the security element 1. The markings 2, 3 are disposed via an intermediate layer 8 on the substrate, the intermediate layer consisting of, for example, a plastic film or paper and having the form of an adhesive label. In this embodiment the two markings are designed as separate areas spaced apart from each other. Independently of the specific geometry and arrangement of the markings and the components of the testing apparatus, the illuminated and the recorded area is always selected in such a way, that both markings are captured.

Figure 4:
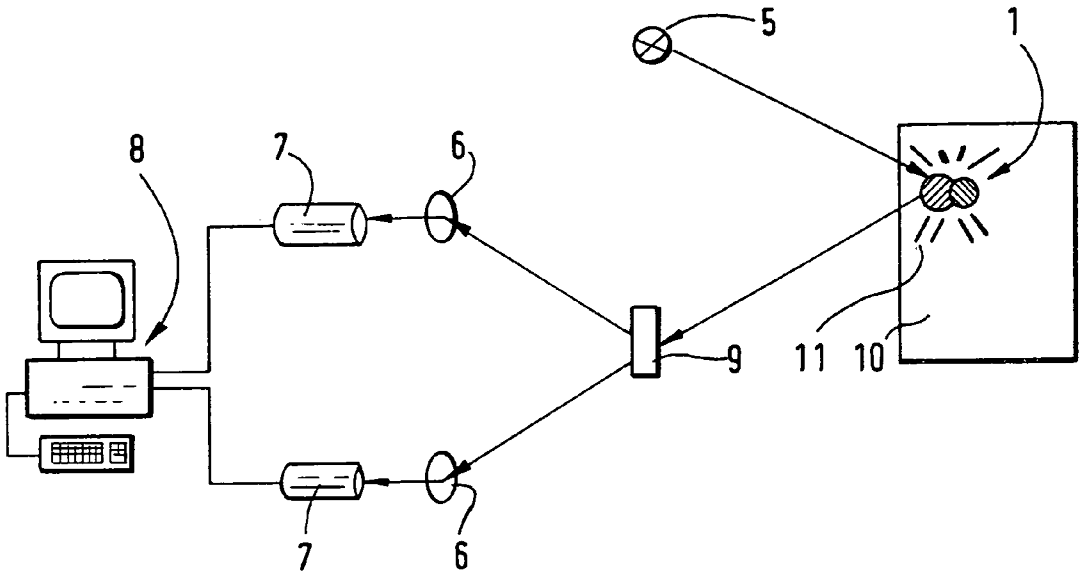
FIG. 4 shows an arrangement for carrying out the inventive method with beam splitter and two cameras.

One further preferred arrangement for carrying out the inventive method is shown in FIG. 4. Here the security element 1 was printed on a document 10 to be tested and the markings consist of two circular-shaped prints partially overlapping each other. By means of printing elements 11, which do not contain any liquid-crystalline material, the markings are graphically integrated in their surroundings. The light reflected by the markings is divided into two equal branches by a beam splitter 9. Each branch has an own camera 7 and a circular polarizer 6, and in one branch the image is recorded with the help of the left-handed circularly polarized light and in the other branch with right-handed circularly polarized light. The images or signals recorded by the cameras 7 are supplied to an evaluation unit 8, which, for example, is a commercial personal computer. The evaluation unit 8 has a monitor, which can be used, among other things, for the representation of the two individual images and the differential image determined therefrom or for displaying the testing result determined by the evaluation unit. This arrangement has the particular advantage, that for the image recording with the left-handed circularly polarized and the right-handed circularly polarized light necessarily the same illumination and image recording conditions are given and that both image recordings can be effected simultaneously. Due to the two independent measuring branches a filter change is not required. Such an arrangement therefore is particularly suitable for testings, in which a high throughput is desired or a high clock rate is required.

Figure 5:
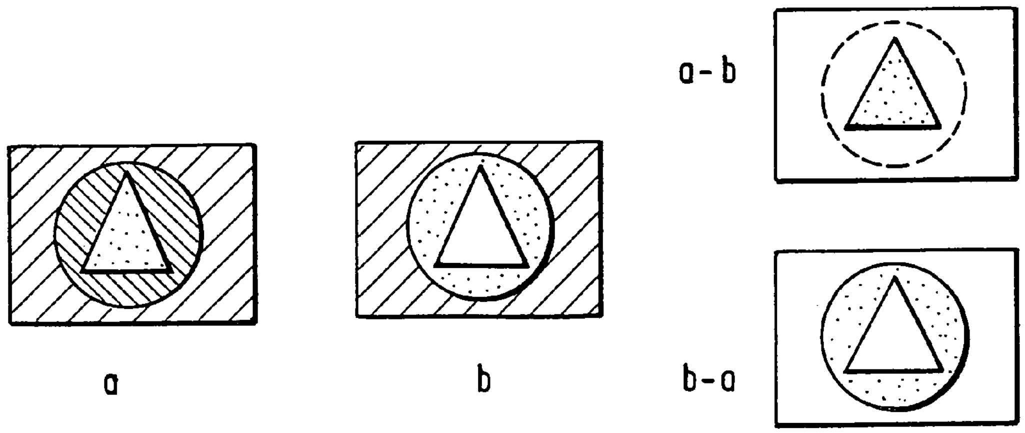
FIG. 5 shows schematic representations of the images made with circular polarizers and the differential images determined therefrom.

In FIG. 5, by way of example for the security element shown in FIG. 1, are explained the contrast conditions of the two images and the differential images determined therefrom. One of the two images of the security element is recorded, for example, with a polarizer for left-handed circularly polarized light and is referred to as a). The first marking 2, which corresponds to the inner area with the form of a triangle, will be represented brightly, if this marking contains liquid-crystalline material with chiral phase that polarizes reflected light in a left-handed circular fashion. The surrounding area with the outline form of a circle corresponds to the second marking 3 and will be represented darkly in the image a), if the material of the second marking polarizes reflected light in a right-handed circular fashion. The area of the security element 1 surrounding the two markings has no liquid-crystalline material, which changes the polarization state of the reflected light. From this area only residual light and scattered light is received and the respective surface is represented only with low intensity, i.e., for example, in a dark grey tone.

In the second image referred to as b), which for example was recorded with a right-handed circularly polarizing filter, the contrast conditions of the two markings 2, 3 are just vice versa. The inner triangular area of the first marking 2, which contains the left-handed circularly polarizing material, appears dark in this image, while the outer circular-shaped area of the second marking 3, which contains the right-handed circularly polarizing material, is represented brightly. The surroundings of the two markings due to residual light and scattered light again appear only with low intensity.

When determining the difference, the intensities of the surroundings are always eliminated, while one of the two markings stands out in a high-contrast fashion and is easily to locate and to recognize. When in the example as explained above the differential image is determined from the differences between the two images (a−b), the first, inner marking is clearly represented in the form of a triangle. In the differential image (b−a), however, is emphasized the circular-shaped outer, second marking. The described effect can be increased, when the differential image is represented in a kind of binary notation, in which all image areas, which lie above a predetermined threshold value, are represented with a maximum intensity, and if they lie below the threshold value with a minimum intensity. In case the images are recorded, for example, with a black-and-white video camera, which allocates grey scale values to the individual image points, which are standardized to a range between 0 and 255, by setting a threshold value, which can be for example 110, a particularly high-contrast black-and-white image can be produced. The markings therein can be tested fast and reliable and evaluated both visually by an inspector and automatically with the help of image processing algorithms and/or pattern recognition algorithms.

A further kind of determining the difference is suitable in particular for the automatic testing with image processing. Here in a first step the form of the marking 2, 3 in image a) is evaluated. From the image data then a so-called "histogram" is formed i.e. the distribution of shades of grey is determined. The image b) is treated analogously. Thereafter the values of the histograms are further processed, as to form the differential values. This has the advantage that not the data of the entire images have to be processed, but substantially smaller data amounts.

The invention claimed is:

1. Method for authenticity testing a security element on the basis of liquid-crystalline materials, the security element having at least one first marking with right-handed circularly polarizing liquid-crystalline material and at least one second marking with left-handed circularly polarizing liquid-crystalline material, or having only one marking which contains both right-handed and left-handed circularly polarizing liquid-crystalline material, the method comprising:

filtering the light impinging on the security element or the light reflected by the security element by means of a first circular polarizer for a first polarization direction, recording a first image of the security element and determining respective intensity values, filtering the light impinging on the security element or the light reflected by the security element by means of a second circular polarizer for a second polarization direction, recording a second image of the security element and determining respective intensity values, determining a differential image from the first and second image by subtracting an intensity value of a partial area of the first image from a respective intensity value of a corresponding partial area of the second image, and deriving a statement about the authenticity of the security element on the basis of the differential image.

2. Method according to claim 1, characterized in that as first and second circular polarizer a right-handed polarizer and a left-handed polarizer are used respectively.

3. Method according to claim 1, characterized in that the security element is illuminated during the image recordings.

4. Method according to claim 1, characterized in that during the recording of the first or the second image the first or the second circular polarizer is located between the security element and an apparatus for recording the image.

5. Method according to claim 1, characterized in that during the recording of the first or the second image the first or the second circular polarizer is located between an illumination apparatus and the security element.

6. Method according to claim 1, characterized in that between the recording of the first image and the recording of the second image an automated change of the circular polarizer is effected.

7. Method according to claim 1, characterized in that for recording each the first and the second image a separate image recording apparatus is used.

8. Method according to claim 7, characterized in that the first and the second image are recorded simultaneously.

9. Method according to claim 7, characterized in that the recording of the first and the second image is effected via a common beam splitter, which is disposed between the two image recording apparatuses and the security element.

10. Method according to claim 1, characterized in that as an image recording apparatus a video camera or a digital camera is used.

11. Method according to claim 1, characterized in that the derivation of a statement about the authenticity of the security element is effected by an electronic evaluation of the differential image.

12. Method according to claim 11, characterized in that for the electronic evaluation of the differential image methods of digital image processing are used.

13. Method according to claim 1, characterized in that the differential image is pictorially represented in a display device.

14. Method according to claim 13, characterized in that the representation of the differential image is effected on a monitor or a display.

15. Method according to claim 3, characterized in that the illumination of the security element is effected by a bundle of light guide fibres.

16. Method according to claim 1, characterized in that before the determination of the difference in at least one of the two images or data of the images a correction is carried out.

17. Method according to claim 1, characterized in that the result of the authenticity testing is transmitted encodedly or is passed on provided with an electronic signature.

18. Method according to claim 1, characterized in that the authenticity testing is carried out on a security element, which is a deposit token of a container.

19. Apparatus for authenticity testing a security element on the basis of liquid-crystalline materials, the security element having at least one marking with right-handed circularly polarizing liquid-crystalline material and at least one second marking with left-handed circularly polarizing liquid-crystalline material, or having only one marking which contains both right-handed and left-handed circularly polarizing liquid-crystalline material, the apparatus comprising:

at least one left-handed circular and one right-handed circular polarizer, at least one image recording apparatus for recording one or several images of the security element and determining respective intensity values, means for determining a differential image that subtracts the intensity values of corresponding partial areas of a left-handed and a right-handed circular image, and means for deriving a statement about authenticity of the security element on the basis of the differential image.

20. Apparatus according to claim 19, characterized in that means for an autonomous evaluation of the differential image are present.

21. Apparatus according to claim 19, wherein said apparatus has means for storing the intensity values of the partial areas of one or several images.

22. Apparatus according to claim 19, wherein said apparatus has an illumination apparatus.

23. Apparatus according to claim 22, characterized in that as an illumination apparatus a bundle of light guide fibres is provided.

24. Apparatus according to claim 19, characterized in that between the security element and an image recording apparatus a circular polarizer is disposed.

25. Apparatus according to claim 22, characterized in that between the illumination apparatus and the security element a circular polarizer is disposed.

26. Apparatus according to claim 19, characterized in that means for an automatic change of a circular polarizer are present.

27. Apparatus according to claim 19, wherein said apparatus has two image recording apparatuses.

28. Apparatus according to claim 27, characterized in that between the security element and the image recording apparatuses a beam splitter is disposed.

29. Apparatus according to claim 19, further comprising a display device for representing the differential image.

30. Apparatus according to claim 19, characterized in that as image recording apparatus/es at least one digital or video camera is provided.

31. Apparatus according to claim 19, characterized in that the left-handed circular and the right-handed circular polarizer are combined in one circular polarizer in such a way, that left-handed circular and right-handed circular areas alternate in a checkerboard fashion, and this combined circular polarizer is disposed directly in front of the image detector of an imaging apparatus.

32. Apparatus according to claim 19, characterized in that in the beam path in front of at least one of the image recording apparatuses at least one colour filter is disposed.

* * * * *